US010770068B2

(12) United States Patent
Tanaka

(10) Patent No.: US 10,770,068 B2
(45) Date of Patent: Sep. 8, 2020

(54) DIALOG AGENT, REPLY SENTENCE GENERATION METHOD, AND NON-TRANSITORY COMPUTER-READABLE RECORDING MEDIUM

(71) Applicant: CASIO COMPUTER CO., LTD., Tokyo (JP)

(72) Inventor: Takahiro Tanaka, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 53 days.

(21) Appl. No.: 15/785,004

(22) Filed: Oct. 16, 2017

(65) Prior Publication Data
US 2018/0158457 A1    Jun. 7, 2018

(30) Foreign Application Priority Data

Dec. 6, 2016   (JP) .................................. 2016-236930

(51) Int. Cl.
| G10L 15/22 | (2006.01) |
| G10L 15/18 | (2013.01) |
| G06F 16/9535 | (2019.01) |
| G10L 13/00 | (2006.01) |
| G10L 15/30 | (2013.01) |

(52) U.S. Cl.
CPC .......... *G10L 15/22* (2013.01); *G06F 16/9535* (2019.01); *G10L 15/18* (2013.01); *G10L 13/00* (2013.01); *G10L 15/30* (2013.01); *G10L 2015/223* (2013.01)

(58) Field of Classification Search
CPC ......... G10L 15/22; G10L 15/18; G10L 13/00; G10L 15/30; G10L 2015/223; G06F 16/9535
See application file for complete search history.

(56) References Cited

U.S. PATENT DOCUMENTS

| 8,521,531 B1* | 8/2013 | Kim .................. G10L 15/22 704/252 |
| 9,367,608 B1* | 6/2016 | Zhang .................... G06F 17/271 |
| 2006/0047632 A1* | 3/2006 | Zhang .................... G06F 16/367 |

(Continued)

FOREIGN PATENT DOCUMENTS

| JP | 10-124515 A | 5/1998 |
| JP | 2003-330923 A | 11/2003 |

(Continued)

OTHER PUBLICATIONS

Japanese Patent Office; Application No. JP 2016-236930; Notification of Reasons for Refusal dated Feb. 13, 2018.

(Continued)

*Primary Examiner* — Fariba Sirjani
(74) *Attorney, Agent, or Firm* — Fitch, Even, Tabin & Flannery LLP

(57) ABSTRACT

A text generating device includes an acquirer that acquires the utterance of the user relative to content provided in real time, a retriever that retrieves from a microblog server data relating to the content, a sentence generator that generates a sentence relating to the content and the acquired utterance of the user, based on the data retrieved by the retriever 140, and an voice outputter and/or a display for using the generated sentence to reply to the user.

17 Claims, 8 Drawing Sheets

(56) References Cited

U.S. PATENT DOCUMENTS

| | | | | |
|---|---|---|---|---|
| 2014/0074483 A1* | 3/2014 | van Os | | G01L 15/22 |
| | | | | 704/275 |
| 2014/0320742 A1* | 10/2014 | Hines | | H04N 7/0882 |
| | | | | 348/468 |
| 2015/0229600 A1* | 8/2015 | Huang | | H04L 51/32 |
| | | | | 709/206 |
| 2015/0324805 A1* | 11/2015 | Skiba | | G06Q 50/01 |
| | | | | 705/7.13 |
| 2016/0188661 A1* | 6/2016 | Huang | | G06F 16/90335 |
| | | | | 707/769 |
| 2016/0203218 A1* | 7/2016 | Vandervort | | G06F 16/951 |
| | | | | 707/767 |
| 2017/0208022 A1* | 7/2017 | Drazin | | G06F 3/0482 |
| 2018/0095958 A1* | 4/2018 | Nicholls | | G06F 16/40 |
| 2019/0020609 A1* | 1/2019 | Asukai | | G06F 13/00 |

FOREIGN PATENT DOCUMENTS

| | | |
|---|---|---|
| JP | 2014-164582 A | 9/2014 |
| JP | 2014-219872 A | 11/2014 |
| JP | 2014-222402 A | 11/2014 |
| JP | 2015-45833 A | 3/2015 |
| JP | 2015-148701 A | 8/2015 |
| JP | 2015-148894 A | 8/2015 |
| JP | 2015-191558 A | 11/2015 |
| JP | 2017-123187 A | 7/2017 |

OTHER PUBLICATIONS

Inaba, et al., "Utterance Generation for Non-task-oriented Dialogue Systems using Twitter", The 27th Annual Conference of the Japanese Society for Artificial Intelligence, Jun. 4, 2013, p. 1-p. 6, Graduate School of Information Sciences,Hiroshima City University.

Inaba, et al., "Candidate Utterance Acquisition Method for Non-task-oriented Dialogue Systems from Twitter", Transactions of the Japanese Society for Artificial Intelligence, vol. 29(2014), No. I SPI-C, p. 21-p. 31.

Grosz, et al., "Centering: A Framework for Modeling the Local Coherence of Discourse", Computational Linguistics, 1995, 21(2): p. 203-p. 225.

Walker, et al., "Centering, Anaphora Resolution, and Discourse Structure", Oxford University Press on Demand, 1998.

JPO; Application No. 2016-236930; Decision of Refusal dated Jul. 10, 2018.

JPO; Application No. 2016-236930; Notice of Reasons for Refusal dated Nov. 19, 2019.

\* cited by examiner

FIG. 6

| RELATED USER ID | POSTED DATA |
|---|---|
| ID0001 | "ISN'T THE FACE OF A SLEEPING KITTEN CUTE?" |
| ID0002 | "ISN'T THE FACE OF A SLEEPING CAT COMFORTING?" |
| ID0003 | "I PREFER DOGS TO CATS." |

FIG. 7

| RELATED USER ID | PRESENT POSTING COUNT Ni | SUM OF CUMULATIVE POSTING COUNT Ni (APPROX. DEGREE OF RELEVANCE) |
|---|---|---|
| ID0001 | 1 | 15 |
| ID0002 | 2 | 9 |
| ID0003 | 1 | 4 |
| ....... | .... | .... |

| TEMPLATE 1 (STRAIGHT-FORWARD TYPE) | "_ _" |
| TEMPLATE 2 (PRONE-TO-EXAGGERATION TYPE) | "_ is very _" |
| TEMPLATE 3 (CALM TYPE) | "_ is somewhat _" |

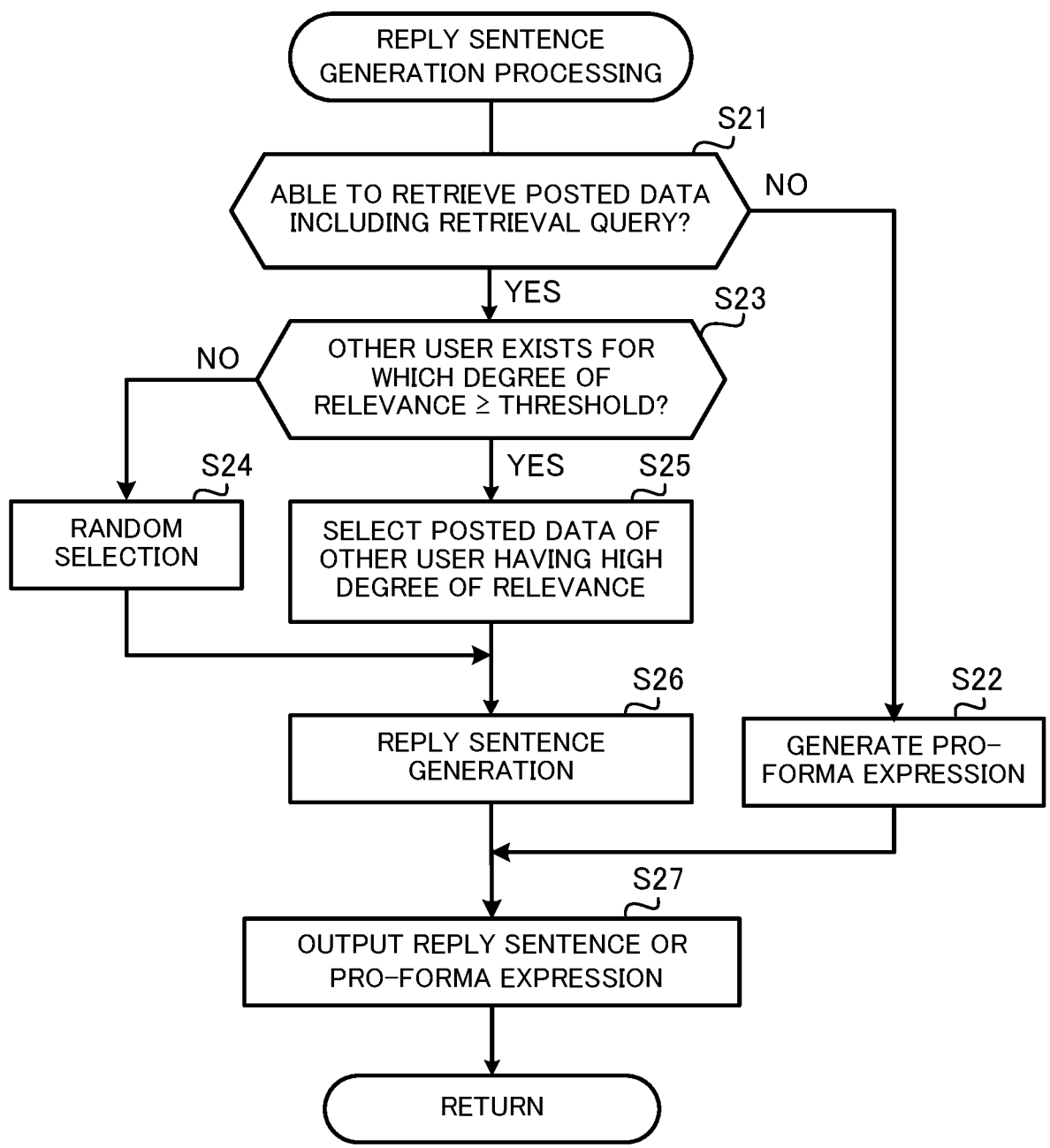

DIALOG AGENT, REPLY SENTENCE GENERATION METHOD, AND NON-TRANSITORY COMPUTER-READABLE RECORDING MEDIUM

CROSS-REFERENCE TO RELATED APPLICATION

This application claims the benefit of Japanese Patent Application No. 2016-236930, filed on Dec. 6, 2016, the entire disclosure of which is incorporated by reference herein.

FIELD

This application relates generally to technology for receiving an utterance of a user and generating a reply sentence in response to the user, and more particularly, to technology for replying in real time concerning a subject of conversation.

BACKGROUND

Dialog systems are being developed for open-domain chatting without a specified task. In comparison to a conversation system oriented toward a specified task, the content of the utterances of the user vary quite broadly for the open-domain dialog system, and thus the task of creating beforehand a knowledge source required for generating a suitable reply sentence is quite difficult.

In order to handle this problem, technology is disclosed for generating an utterance sentence by use of microblogs such as Twitter (registered trademark) for which there exist a large number of sentences (Michimasa Inaba, Sayaka Kamizono, and Kenichi Takahashi, "Candidate Utterance Acquisition Method for Non-task-oriented Dialogue Systems from Twitter", Journal of Japanese Society for Artificial Intelligence, Vol. 29, No. 1, SP1-C, 2014). Further, Unexamined Japanese Patent Application Kokai Publication No. 2015-45833 discloses technology for generating an utterance sentence by extracting a term meaning a subject of utterance content from utterance content of a user and substituting the term into a template. Unexamined Japanese Patent Application Kokai Publication No. 2014-164582 discloses, in a system for dialog with a user by use of natural language, an utterance candidate generating device of a dialog system for generating an utterance candidate using a microblog.

Additionally, robots termed "personal assistants" or "dialog agents" are being developed that receive an utterance from a user and return a response to the user. A dialog agent is a robot that serves as a partner, located in the vicinity of the user, in a casual chat (for example, see Unexamined Japanese Patent Application Kokai Publication No. 2017-123187). Dialog agents also include applications fictitiously operating in the computer.

SUMMARY

According to an aspect of the present disclosure, in a dialog agent for receiving an utterance of a user and returning a response to the user, the dialog agent includes:

an acquirer for acquiring the utterance of the user relative to content provided in real time;

a retriever for retrieving from a microblog server data relating to the contents;

a sentence generator for using the data retrieved by the retriever to generate a sentence relating to the content and the acquired utterance of the user; and a responder for using the sentence generated by the sentence generator to respond to the user.

BRIEF DESCRIPTION OF THE DRAWINGS

A more complete understanding of this application can be obtained when the following detailed description is considered in conjunction with the following drawings, in which:

FIG. 6 is a table for description of an example of retrieved posted data of other users;

FIG. 7 is a table for description of a method of evaluation of the other users;

FIG. 11 is a flowchart for description of reply sentence generation processing.

DETAILED DESCRIPTION

A dialog system 1 using a text generating device according to the present embodiment is described below with reference to FIG. 1. In the present embodiment, a case is described in which the text generating device 100 is used in a conversing-type pet robot 10, which is one kind of personal assistant (also termed a "dialog agent") for conversing with a user. When a user A speaks to the pet robot 10, the text generating device 100 included in the pet robot 10 generates and outputs a reply sentence suitable for the utterance of the user. A case is described below in which, when a user A is speaking to the pet robot 10 while together with the pet robot 10 watching some kind of television program, the user A utters a comment or the like to the pet robot 10 in real time concerning the television program.

Figure 1:
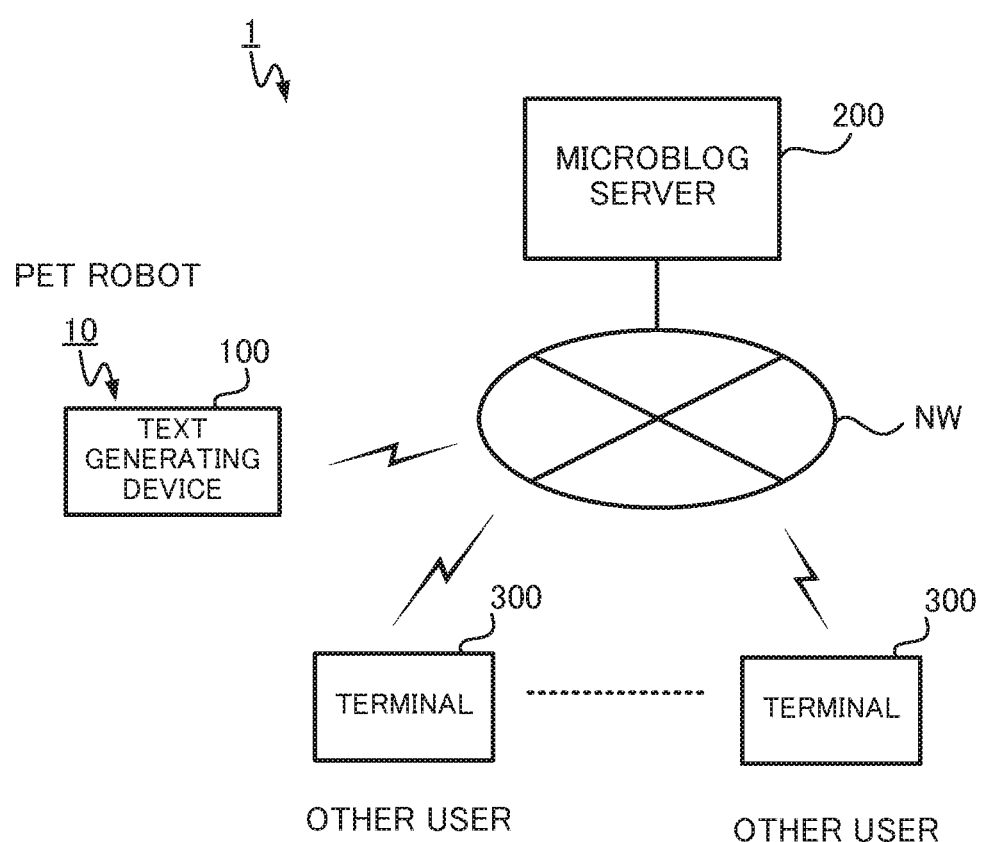
FIG. 1 is a configuration diagram of a dialog system according to Embodiment 1.

In the dialog system 1 illustrated in FIG. 1, the text generating device 100, by performing communication with a microblog server 200 via a network NW, posts on the microblog server 200 the utterance made by the user A. From the terminals 300 of other users, the other users post on the microblog server 200 their respective utterances. Thus utterances made by users are accumulated as posted data on the microblog server 200. The text generating device 100 included in the pet robot 10, by an input operation or the like performed by the user A, acquires the television program being watched by the user A, and then connects to a corresponding bulletin board of the microblog server 200. Further, the text generating device 100 may be configured to acquire the television program information from a television and the like. Further, the text generating device 100 can access the microblog server 200 and acquire the posted data accumulated on the microblog server 200. That is to say, the text generating device 100 can acquire the utterances made by other users. When the user A makes an utterance to the pet robot 10, the text generating device 100 included in the pet robot 10 accesses the microblog server 200 and retrieves the posted data (microblog data) posted on the bulletin board corresponding to the television program being watched by the user A. Thereafter, the text generating device 100 acquires the posted data of the other users concerning the utterance made by the user A, and based on the acquired posted data, generates a reply sentence.

Retweets are a major characteristic of Tweeter (trademark). A "retweet" is generally defined as "citing an utterance (tweet) posted by another person". The inclusion or omission of retweets is technically possible during the searching of the posted data on the microblog server 200. Further, searching for only tweets in English and searching of tweets in multiple languages are both technically possible. The count of the number of postings is to include both postings including retweets and postings not including retweets. Further, when the number of postings is counted, the count is to include tweets in the language of the country in which the user A lives and tweets in languages of other countries. Basically retweets are also searched due to the number of retweets indicating a magnitude of the response toward the utterance. Due to tweets in languages of other countries not being caught by searches even though the subject is the same, translated tweets are to be searched when searching tweets in the languages of the other countries. Searching tweets in foreign languages enables the pet robot 100 to make statements such as "in japan, there sure seems to be a lot of talk now about the Tokyo Olympics".

Figure 2:
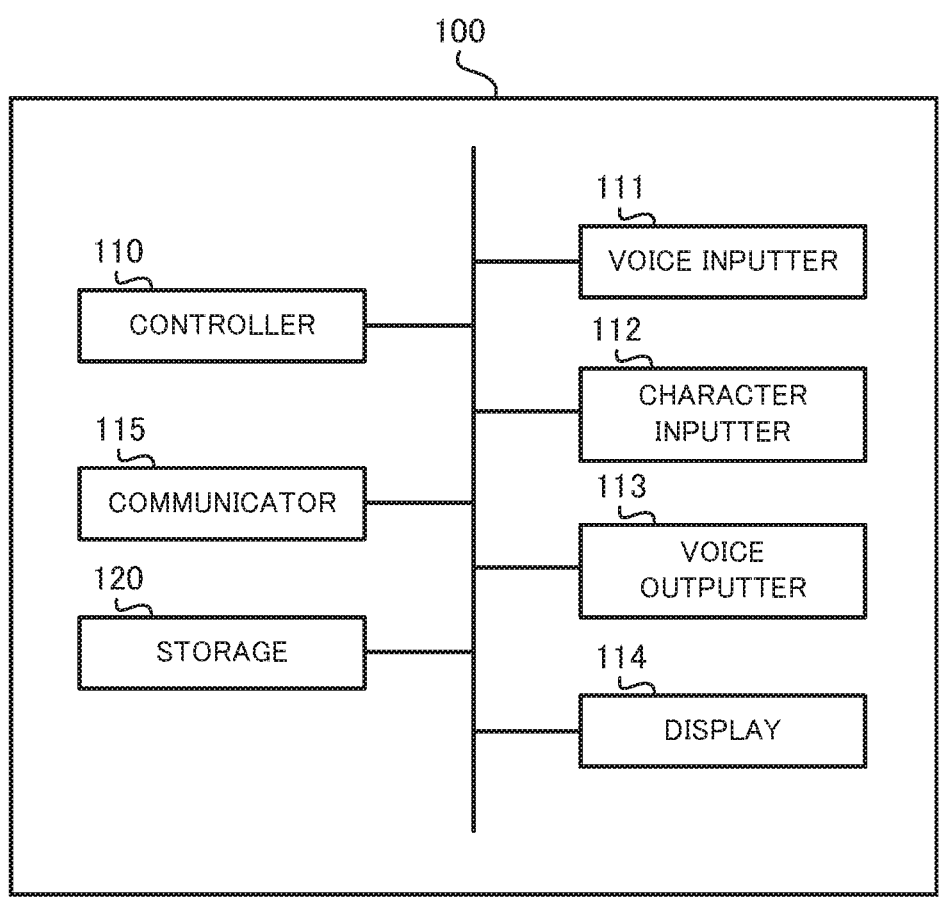
FIG. 2 is a diagram illustrating physical configuration of a text generating device according to Embodiment 1.

Physical configuration of the text generating device 100 is described hereinafter with reference to FIG. 2. The text generating device 100, as illustrated in FIG. 2, includes a controller 110, an voice inputter 111, a character inputter 112, an voice outputter 113, a display 114, a communicator 115, and a storage 120.

The controller 110 includes components such as a central processing unit (CPU), and by execution of a program stored in the storage 120, achieves functions of various below-described components, that is, an acquirer 130, a retriever 140, an evaluator 150, and a sentence generator 160.

The voice inputter 111 includes a voice recognition device and an audio input device such as a microphone, and the voice inputter 111 converts the voice of the user A into text data. Specifically, the audio input device such as the microphone of the voice inputter 111 converts the speech uttered by the user A into audio data, and the voice recognition device performs voice recognition of this audio data to convert this audio data into the text data. The voice inputter 111 supplies the acquired text data to the controller 110.

The character inputter 112 includes components such as a keyboard and a touch panel. The character inputter 112 acquires, as the text data, keyed input inputted by the user A. The character inputter 112 supplies to the controller 110 the acquired text data. The user A can input the utterance by the text data from the character inputter 112. Further, the user A can set below-described time periods T1 and T2 from the character inputter 112.

The voice outputter 113 includes a speaker. The voice outputter 113 outputs as sound the reply sentence generated by the below-described sentence generator 160.

The display 114 includes components such as a liquid crystal display. The display 114 displays the reply sentence generated by the below-described sentence generator 160.

The communicator 115 is a communication device for communication with the microblog server 200 via the network NW. For example, the communicator 115 is a communication device for performance of wireless communication on the basis of a protocol such as that of a wireless local area network (LAN).

The storage 120 includes components such as a read only memory (ROM) and a random access memory (RAM). The ROM stores information required beforehand such as programs for execution by the CPU of the controller 110 and data required for execution of the programs. The RAM stores data that is generated, modified, and the like during program execution.

Figure 3:
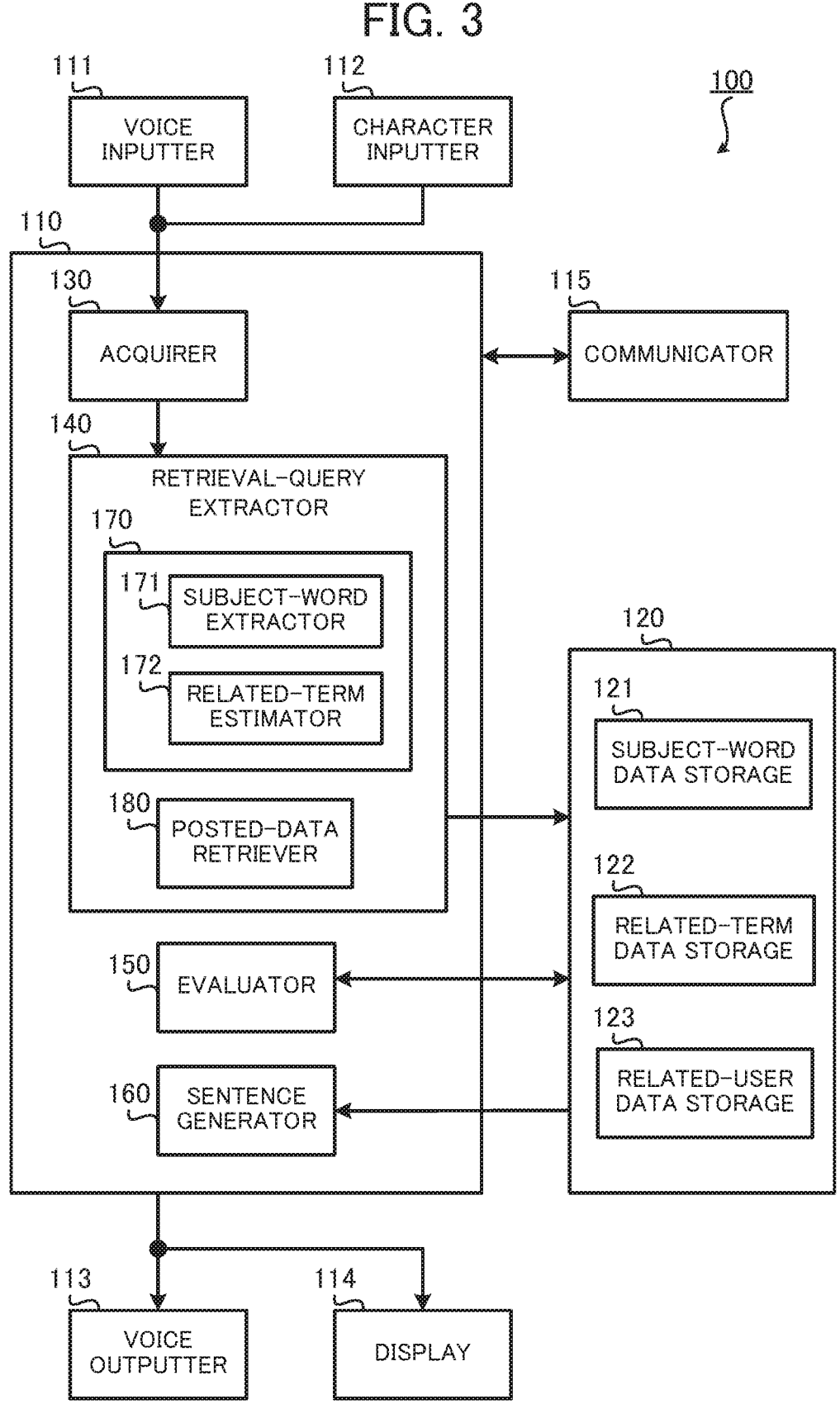
FIG. 3 is a diagram illustrating functional configuration of the text generating device according to Embodiment 1.

Functions of the controller 110 are described hereinafter with reference to FIG. 3. As illustrated in FIG. 3, the controller 110 includes the acquirer 130, the retriever 140, the evaluator 150, and the sentence generator 160. Further, the storage 120 includes a subject-word data storage 121, a related-term data storage 122, and a related-user data storage 123.

The acquirer 130 acquires from the voice inputter 111 the text data expressing the utterance made by the user A. Alternatively, text data expressing the utterance input by the user A is acquired from the character inputter 112. The acquirer 130 supplies the acquired text data to the retriever 140.

The retriever 140 retrieves from the microblog server 200 via the communicator 115 data including at least a portion of the utterance of the user A. The retriever 140 includes a retrieval-query extractor 170 and a posted-data retriever 180.

The retrieval-query extractor 170 extracts, as a retrieval-target character string, that is, as a retrieval query, a subject term and related terms relating to the subject term of the utterance of the user A. The retrieval-query extractor 170 includes a subject-word extractor 171 and a related-term estimator 172.

The subject-word extractor 171 extracts a subject term (also termed a "focus term") of the utterance from the utterance of the user A. Technology described in Reference Literature 1 (Barbara J. Grosz, Scott Weinstein, and Aravind K. Joshi, "Centering: A Framework for Modeling the Local Coherence of Discourse", Computational linguistics, 21(2): 203-225, 1995) and Reference Literature 2 (Marilyn A. Walker, "Centering, Anaphora Resolution, and Discourse Structure", Oxford University Press on Demand, 1998), for example, can be used by the subject-word extractor 171 as the method for extracting the subject term of the utterance from the utterance of the user. Roughly speaking, the subject-word extractor 171 performs morphological analysis to break down the utterance of the user A into nouns, conjunctions, modifiers, verbs, and the like, and the subject-word extractor 171 specifies the subject term on the basis of subject-predicate relationship and the like.

For example, when the utterance of the user A is "isn't the face of a sleeping cat very cute?", the portion corresponding to the subject terms is "face of a sleeping cat". The subject-word extractor 171 extracts as the subject terms "face of a sleeping cat".

The related-term estimator 172 estimates related terms that are related to the subject terms extracted by the subject-word extractor 171. The related-term estimator 172 uses, as the method of estimating the related terms, previously known technology using a thesaurus dictionary, or previously known technology using a topic model that estimates synonyms on the basis of co-occurrence relationships between terms.

For example, in the case in which the subject terms are "face of a sleeping cat", the related-term estimator 172 estimates, as the related terms, "cat face", "cat yawn", "cat gesture", "cat", "dog face", "dog", and the like.

The retrieval-query extractor 170 sets as the retrieval query the subject terms extracted by the subject-word extractor 171 and the related terms estimated by the related-term estimator 172.

The posted-data retriever 180 retrieves from the microblog server 200 posted data that includes this retrieval query. Specifically, by accessing the microblog server 200 via the communicator 115, the posted-data retriever 180, from the posted data posted by the other users retained by the microblog server 200, acquires the posted data that includes the retrieval query.

Figure 4:
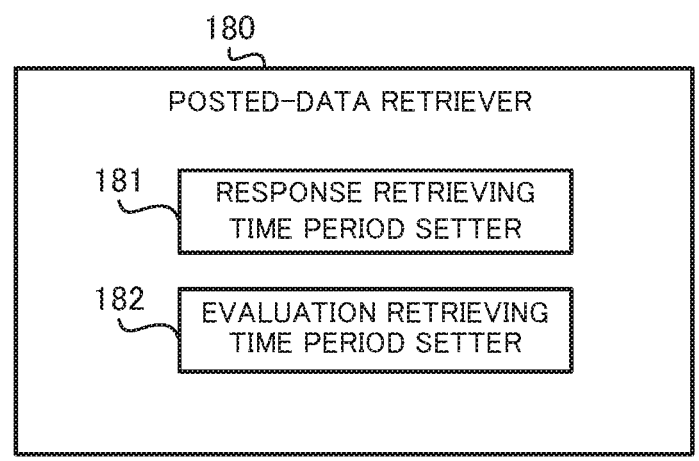
FIG. 4 is a configuration diagram of a posted-data retriever of the text generating device according to Embodiment 1.

Further, the posted-data retriever 180, as illustrated in FIG. 4, includes a response retrieving time period setter 181 and an evaluation retrieving time period setter 182.

The response retrieving time period setter 181 sets the time period T1 for retrieval of the microblog data in order to generate the reply sentence with respect to the utterance made by the user A. The response retrieving time period setter 181 extracts this time period T1 on the basis of an input operation from the character inputter 112 by the user A. The text generating device 100, on the basis of the posted data of the other users retrieved in this time period T1, generates the reply sentence with respect to the utterance of the user A. More posted data can be acquired as the length of this time period T1 is extended, and thus the probability of being able to generate a reply sentence suitable for the utterance of the user A increases. Further, the time until the sentence is generated is extended as the time period T1 becomes longer. In the case in which the text generating device 100 is included in the pet robot 10, speed of response of the pet robot 10 is determined by this time period T1.

In the aforementioned manner, the user A can set the time period T1 by input from the character inputter 112. For example, a fast response speed time period T1 can be set to 1 second, a normal response speed time period T1 can be set to 3 seconds, and a slow response speed time period T1 can be set to 10 seconds. Alternatively, someone, such as a system manager, may use experiments to find a relationship between the time period T1 and output content of the text generating device 100 and may set the time period T1 beforehand in a program of this system. Specifically, frequency of the below-described pro-forma expressions for multiple persons by subjective evaluation, degree of appropriateness for the generated reply sentence relative to the utterance of the user A, and the like are evaluated. Thereafter, someone such as the system manager may set the time period T1 on the basis of results of such evaluation.

The evaluation retrieving time period setter 182 sets the time period for retrieving the microblog data in order to acquire the posted data used in the below-described evaluation of the related users. Further, the term "related user" refers to a user, among the other users, who previously posts data related to an utterance posted by the user A.

Figure 5:
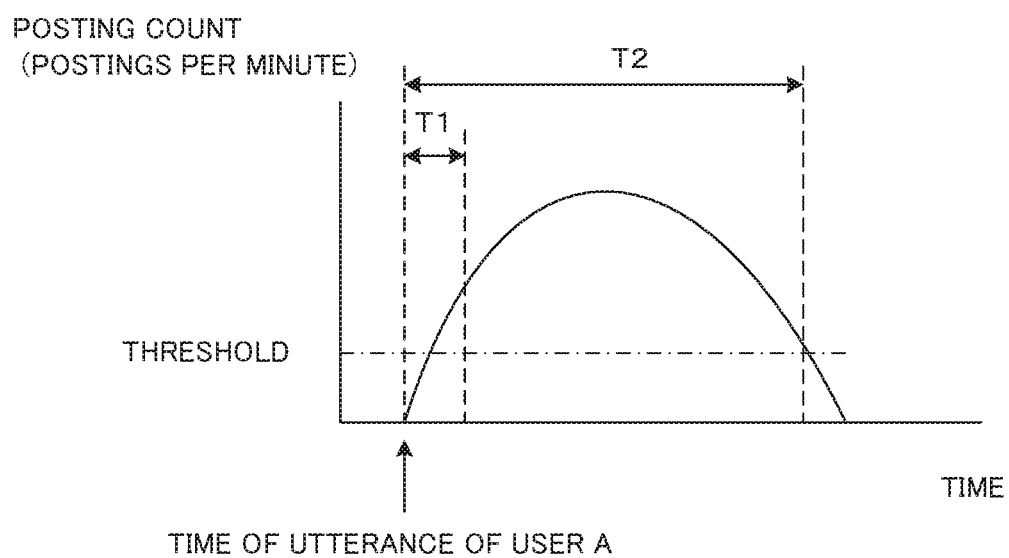
FIG. 5 is a graph for description concerning a distribution of posted article count.

Furthermore, in the case of prior posting by the user A of a certain utterance on the microblog, posted article counts of the other users related to such an utterance have the distribution illustrated in FIG. 5, for example. The horizontal axis of the graph illustrated in FIG. 5 indicates elapsed time after the time at which user A made the utterance. Further, the vertical axis indicates the posted article count of other users per unit time (such as 1 minute). When a certain utterance of the user A is posted in the microblog, the posted article count of other users related to the certain utterance gradually increases, and after a certain time period elapses, the posted article count of the other users tends to decrease and converges to zero.

The evaluation retrieving time period setter 182 measures for each predetermined time period (such as 1 minute) a count of posted data retrieved by the retriever 140. Upon detecting that the measured count of the posted data is less than a predetermined threshold (for example, 3 postings per minute), the evaluation retrieving time period setter 182 sends notification to the posted-data retriever 180 that the measured count of the posted data is below the threshold. Upon receiving this notification, the posted-data retriever 180 stops retrieving of the microblog data. The time period T2 is taken to be the time period until detection by the evaluation retrieving time period setter 182 that the count of the posted data after the time of utterance by the user A becomes less than or equal to the threshold.

The posted-data retriever 180, among the posted data of the other users retrieved from the microblog server 200, stores in the subject-word data storage 121 within the storage 120 the posted data including the subject terms, and stores in the related-term data storage 122 the posted data that contains only the related terms while not including the subject terms. An example of the posted data retrieved by the posted-data retriever 180 from the microblog server 200 is illustrated in FIG. 6. For example, in the case in which the utterance of the user A is "isn't the face of a sleeping cat very cute?", posted data of the related user whose ID is ID0002 is stored in the subject-word data storage 121 due to including of the subject terms "face of a sleeping cat". The posted data of the related user having the ID of ID0001 and the related user having the ID of ID0003 do not include the subject terms "face of a sleeping cat", but include the related term "face of a sleeping kitten", "cat", or "dog", and thus such posted data are stored in the related-term data storage 122.

Again in reference to FIG. 3, the evaluator 150 evaluates the acquired posted data and determines for each other user a degree of relevance between the other user and the user A. The evaluator 150 determines the degree of relevance on the basis of the number of postings related to the utterance of the user A. Specifically, the evaluator 150 measures the number of postings of the other users on the basis of data, specifying the other users, acquired by the retriever 140 together with the posted data including the retrieval query. The expression "data specifying the other users" means data such as a URL, a user ID, and a blog nickname that are of the other user.

For each of the other users, the evaluator 150 counts the posted data retrieved by the retriever 140 with respect to a single utterance of the user A. The evaluator 150 performs this measurement in the time period T2 indicated in FIG. 5 with respect to the single utterance of the user A. Then the evaluator 150 performs this measurement for each utterance by the user A, sequentially sums the measured counts, and finds a cumulative posting count. This cumulative posting count is sequentially updated each time the user A makes an utterance. The evaluator 150 continues this cumulative posting count until the end of the television program corresponding to the measurement.

An example of the cumulative posting count measured by the evaluator 150 is illustrated in FIG. 7. The table illustrated in FIG. 7 is an example of the measured posted data acquired in the time period T2 after a certain posting by the user A. In the example illustrated in FIG. 7, the posting count by the other user, for which the related user ID is ID0001, at the time period T2 relative to the present utterance by the user A is 1 posting. Further, the cumulative posting count after the start of broadcast of this television program is 15 postings. The posting count by the other user, for which the related user ID is ID0002, in the time period T2, is 2 postings. Further, the cumulative posting count after the start of broadcast of this television program is 9 postings.

Further, the table illustrated in FIG. 7 is formed for each user posting to the microblog server 200, and is formed for each television program watched by the posting user. Further, each table is updated each time the corresponding user posts.

The evaluator 150, on the basis of this cumulative posting count, determines the degree of relevance between another user and the user A. Specifically, the higher the value of this cumulative posting count, the higher the evaluator 150 raises the degree of relevance of the other user. The evaluator 150 stores in the related-user data storage 123 within the storage 120 the evaluation data illustrated in FIG. 7. Further, the below-described posted-data selector 161 of the sentence generator 160 selects the posted data of the other user on the basis of the cumulative posting count at the time of selection.

Figures 8, 9:
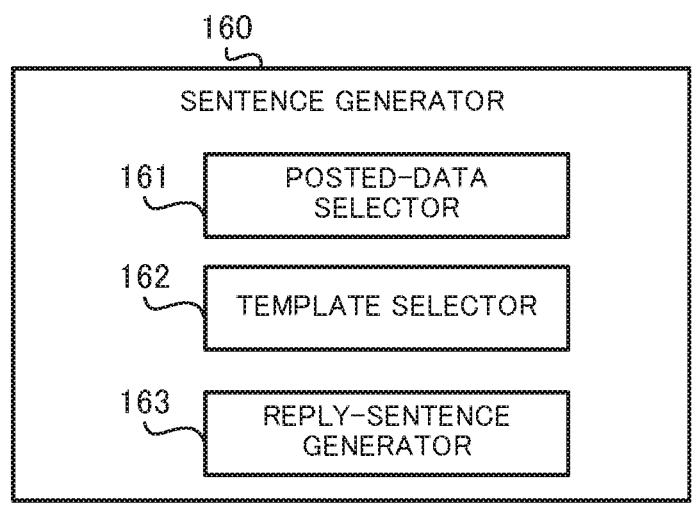
FIG. 8 is a configuration diagram of a sentence generator of the text generating device according to Embodiment 1.
FIG. 9 is a table for description of an example of a template.

Again in reference to FIG. 3, the sentence generator 160, on the basis of the posted data retrieved by the retriever 140, generates the sentence responding to the utterance of the user A. Specifically, the sentence generator 160, on the basis of the degree of relevance from among the posted data retrieved by the retriever 140, selects the posted data and generates the sentence responding to the utterance of the user A. Further, the sentence generator 160 selects a template expressing a pseudo-personality of the pet robot 10, applies the selected posted data to this template, and generates the sentence responding to the utterance of the user A. The sentence generator 160, as illustrated in FIG. 8, includes the posted-data selector 161, a template selector 162, and a reply-sentence generator 163. These components are described below in detail.

The posted-data selector 161, on the basis of the degree of relevance determined by the evaluator 150, selects the posted data to be used in the reply sentence from among the posted data retrieved by the retriever 140 from the microblog server 200. For example, in the case in which another user exists for which the cumulative posting count stored in the related-user data storage 123 is greater than or equal to a threshold (for example, 10 postings), the posted-data selector 161 selects the posted data of the other user for which the cumulative posting count is highest. Further, in the case in which there are no postings of another user for which the cumulative posting count is greater than or equal to the threshold, the posted-data selector 161 selects the posted data at random from among the posted data retrieved by the retriever 140.

For example, the posted data retrieved in the time period T1 is taken to be the posted data illustrated in FIG. 6, and the cumulative posting counts of the other users stored in the related-user data storage 123 are taken to be the counts illustrated in FIG. 7. In this case, among the related users indicated in FIG. 7, the other user with the cumulative posting count greater than or equal to the threshold (for example, 10 postings) and having the highest cumulative posting count is the other user with ID0001. Thus the posted-data selector 161, from among the posted data illustrated in FIG. 6, selects the posted data "isn't the face of a sleeping kitten cute?" posted by the other user ID0001.

For pseudo-expression of personality in the response, the template selector 162 selects a template for use in the response from among the templates stored beforehand in the storage 20.

For example, the method of expression of adjectives has characteristics that indicate the personality of the respondent. On the basis of the method of expression of adjectives, the personality of the respondent can be pseudo-expressed, for example, as a straight-forward type personality, a prone-to-exaggeration type personality, a calm type personality, and the like. The storage 20 stores various types of templates that express the respective personalities.

An example of templates stored in the storage 20 is illustrated in FIG. 9. Further, the personality of the responding pet robot 10 is set by the user A from the character inputter 112. Further, the aforementioned set of personalities is one example, and the storage 20 may store other templates for expression of other personalities. The template selector 162 selects the template expressing the personality set by the user A.

The reply-sentence generator 163 fits the posted data into the template selected by the template selector 162 and generates the sentence responding to the utterance of the user A. For example, in the case in which the "prone-to-exaggeration type" is selected as the pseudo-personality of the pet robot 10 and the selected posted data is "isn't the face of a sleeping kitten cute?", the reply-sentence generator 163 generates the reply sentence "the face of a sleeping kitten is so cute!" Thereafter, the sentence generator 160 outputs audio from the voice outputter 113 as "the face of a sleeping kitten is so cute!" Further, "the face of a sleeping kitten is so cute!" is displayed on the display 114.

Text generation processing executed by the text generating device 100 having the aforementioned configuration is described next with reference to the flowcharts illustrated in FIG. 10 and FIG. 11. A case is described below in which, while the user A watches a pet-related television program, the user A, to the pet robot 10 in which the text generating device 100 is mounted, utters a comment or the like related to the pet-related television program. Every time the user A watching a certain television program makes an utterance, the text generating device 100 posts the utterance on a bulletin board corresponding to the television program of the microblog server 200. Further, other users watching the same television program and viewing the posted data of the user A posted on the microblog server 200 are taken to post respective user utterances from the respective user terminals 300 onto the same bulletin board of the microblog server 200. Here, a case is described in which the user A enters by voice the utterance into the text generating device 100, and the text generating device 100 uses sound to output the reply sentence. The time period T1 is set beforehand by the user A, and the pseudo-personality of the pet robot 10 is taken to be set to the "prone-to-exaggeration" type. The user A connects the text generating device 100 to the microblog server 200 via the communicator 115, and by posting the utterance of the user A on the microblog server 200, the text generating device 100 starts the text generation processing illustrated in FIG. 10.

When the user A makes the utterance to the pet robot 10 by expressing the comment or the like while watching the pet-related television program, the voice inputter 111 of the text generating device 100 mounted in the pet robot 10 converts the utterance to text data. The text generating device 100 posts the utterance of the user A to the microblog server 200 via the communicator 115. Further, the acquirer 130 by the text data acquires utterance of the user A from the voice inputter 111 (step S1), and supplies the acquired text data to the retriever 140. The retrieval-query extractor 170 of the retriever 140 extracts the retrieval query from such text data (step S2). Specifically, the subject-word extractor 171 extracts the subject terms from the text data. Further, the related-term estimator 172 estimates the related terms related to the subject terms.

For example, when the user A makes the utterance "isn't the face of a sleeping cat very cute?", the subject-word extractor 171 extracts as the subject terms "face of a sleeping cat". Further, the related-term estimator 172 estimates as related terms "cat face", "cat yawn", "cat gesture", "dog face", and the like. The retrieval-query extractor 170 extracts as the retrieval query these subject terms and related terms.

Next, via the communicator 115 from the microblog data within the microblog server 200, the posted-data retriever 180 retrieves the posted data including the retrieval query extracted by the retrieval-query extractor 170 (step S3). The posted-data retriever 180 continues the retrieving of step S3 until completion of retrieving for the preset time period T1 (NO in step S4). For example, the posted-data retriever 180 retrieves from the microblog data the posted data including the subject terms such as those illustrated in FIG. 6, and the posted data including related terms. Then upon completion of the retrieving of the time period T1 (YES in step S4), the sentence generator 160 performs generation processing of the reply sentence corresponding to the utterance of the user A (step S5). The reply sentence generation processing is described with reference to FIG. 11.

Upon starting of the reply sentence generation processing, the sentence generator 160 confirms whether the retriever 140 was capable of retrieving the posting data including the retrieval query within the time period T1 (step S21). Then in the case in which such posted data could not be retrieved (NO in step S21), the sentence generator 160 generates a sentence including pro-forma expressions such as "oh?", "that's right", "is that right?", and the like that do not impart a sense of incongruity to the user (step S22). Specifically, terms for output as pro-forma expressions are stored beforehand in the storage 120, and the sentence generator 160 generates the reply sentence by acquiring the pro-forma expressions from the storage 120 and fitting the reply sentence into a pro-forma expression template. The pro-forma expressions are terms to prevent a pause in the conversation until the generation of the reply sentence.

In the case in which posted data including the retrieval query can be retrieved in the time period T1 (YES in step S21), the posted-data selector 161 of the sentence generator 160 confirms whether, among the other users who posted data that was retrieved, another user exists for which the cumulative posting count is greater than or equal to the threshold (step S23). Specifically, the posted-data selector 161 confirms whether another user exists for which the cumulative posting count of the other user, stored in the related-user data storage 123, is greater than or equal to the threshold (for example, 10 postings). In the case in which no other user exists for which the cumulative posting count is greater than or equal to the threshold (NO in step S23), the posted-data selector 161, from among posted data of the other users retrieved by the retriever 140, selects posted data at random (step S24), for example, and transitions to step S26. However, in the case in which another user is present for which the cumulative posting count is greater than or equal to the threshold (YES in step S23), the posted-data selector 161 selects the posted data (posted data having the highest degree of relevance) of the other user for which the cumulative posting count is highest (step S25). In the example illustrated in FIG. 7, the cumulative posting count of the related user having the ID that is ID0001 is highest, and thus the posted-data selector 161, from among the posted data illustrated in FIG. 6, selects the posted data "isn't the face of a sleeping kitten cute?" of the related user having the ID that is ID0001.

Thereafter, the sentence generator 160 uses the selected posted data to generate the reply sentence (step S26). Specifically, the personality of the pet robot is set to the "prone-to-exaggeration" type, and thus, from among the templates illustrated in FIG. 9, the template selector 162 selects the template "_is so_!" Then the reply-sentence generator 163 fits the selected posted data "isn't the face of a sleeping kitten cute?" into the template "_is so_!" to generate the reply sentence "the face of a sleeping kitten is so cute!" Then the sentence generator 160 outputs sound from the voice outputter 113 saying "the face of a sleeping kitten is so cute!" (step S27). Further, in the case in which the sentence generator 160 cannot generate the reply sentence, the pro-forma expression generated in step S22 is output as sound.

Figure 10:
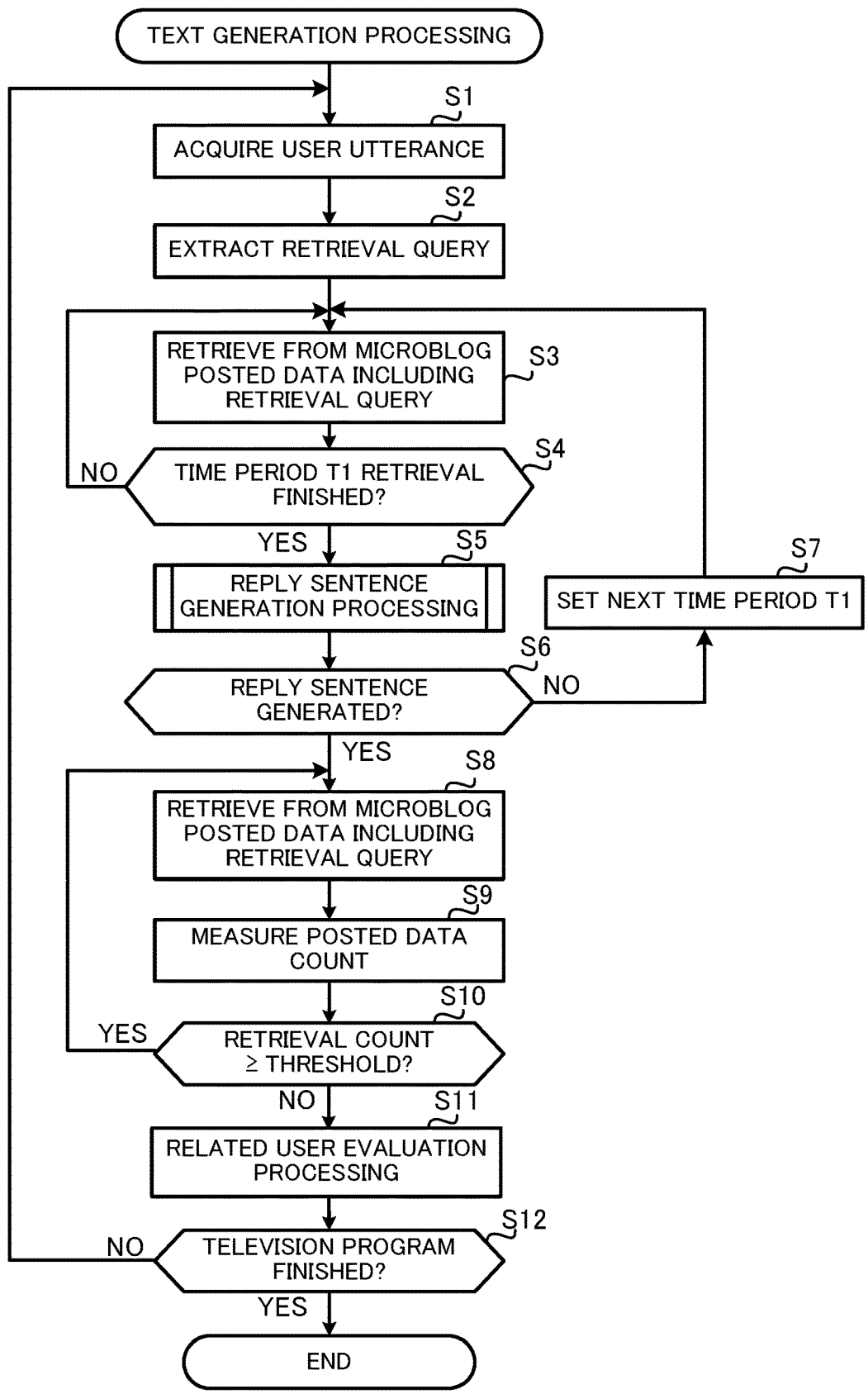
FIG. 10 is a flowchart for description of text generation processing.

Again with reference to step S6 of FIG. 10, in the case in which the sentence generator 160 is previously unable to generate the reply sentence (NO in step S6), the retriever 140 sets the next time period T1 (step S7), and the processing is repeated from step S3 to step S6.

However, in the case in which the sentence generator 160 can previously generate the reply sentence (YES in step S6), in order to perform evaluation processing of the related users, the evaluator 150 continues retrieving the posted data including the retrieval query even after elapse of the time period T1 (step S8). In parallel with this retrieving, the evaluation retrieving time period setter 182 measures the count of the posted data retrieved by the retriever 140 for each certain time period (for example, 1 minute) (step S9). During the time interval when the count of the posted data measured by the evaluation retrieving time period setter 182 is greater than or equal to a preset threshold (for example, 3 postings per minute) (YES in step S10), the retriever 140 continues the aforementioned retrieving (from step S8 to step S10). That is to say, during the interval of the time period T2 illustrated in FIG. 5, the posted data including the retrieval query is retrieved from the microblog server 200. Then in the case in which the count of posted data measured by the evaluation retrieving time period setter 182 is less than the preset threshold (for example, 3 postings per minute) (NO in step S10), the retriever 140 stops the aforementioned retrieving. The evaluator 150 evaluates the other users for which there is prior posting related to the utterance of the user A in this time period T2 (step S11). Specifically, the evaluator 150 measures the posting counts of other users for which there is prior posting in the time period T2 and measures a "present posting count" illustrated in FIG. 7. Further, each time the user A makes an utterance, the evaluator 150 measures the cumulative posting count since the start of the television program. The evaluator 150 uses as the degree of relevance of the other user a measured cumulative posting count.

By the aforementioned processing, the reply sentence generation processing in response to the single utterance of the user and the other user evaluation processing is completed. The text generating device 100, on the basis of a state of postings to the microblog server 200, confirms whether the corresponding television program is finished (step S12). Upon determination that the corresponding television program is not finished (NO in step S12), the text generating device 100 continues the processing from step S1 to step S11. The evaluator 150 measures the posting counts of the other users in each repeated iteration of this processing and updates the cumulative posting count illustrated in FIG. 7.

However, upon determination that the corresponding television program is completed (YES in step S12), the text generating device 100 ends the text generation processing. Further, even in the case in which the television program watched by the user A changes and the communication line between the text generating device 100 and the microblog server 200 is cut, the text generating device 100, due to an inability to acquire the state of postings to the microblog server 200, determines that the corresponding television program is completed.

The text generating device 100 in the aforementioned manner, from the utterance of the user A, sets as the retrieval query the subject terms of the utterance and the related terms of such subject terms. Thereafter, the text generating device 100 retrieves from the microblog data the posted data of the other users including the retrieval query, and using the retrieved posted data, generates the reply sentence with respect to the utterance of the user A. By this means, the text generating device 100 can generate the reply sentence suitable for the utterance of the user A, even when a large volume of reply sentences is not stored beforehand in the storage 120.

Further, from among the microblog data posted in the immediately recent time period T1 after the time of the utterance of the user A, the text generating device 100 retrieves the posted data of the other users that include the retrieval query. Then the text generating device 100, without using a reply sentence generation template having a limited pattern for generation of a previously generated reply sentence, uses the retrieved posted data to generate the reply sentence appropriate for the utterance of the user A. By this means, the text generating device 100 can avoid generating a reply sentence that would cause the user A to quit the conversation, such as a humdrum reply sentence, a reply sentence that is little related to the utterance of the user A, or an artificial-sounding reply sentence. Thus the text generating device 100 can generate a reply sentence such that the user A would like to continue the conversation.

Further, the text generating device 100 includes the evaluator 150 that evaluates the retrieved posted data and determines the degree of relevance between the user and the other users for which there is prior posting. Then the sentence generator 160, from among the data retrieved by the retriever 140, uses the posted data selected on the basis of the degree of relevance to generate the reply sentence. Such processing enables increased probability that the text generating device 100 uses the posted data of the other users viewing the same viewing target (television program) as that viewed by the user to generate the reply sentence. Thus the probability of generating the reply sentence appropriate for the utterance of the user can be increased.

Further, the text generating device 100 includes the template selector 162 for selection of the template that expresses a personality. The template selector 162 selects the template expressing the pseudo-personality of the pet robot 10 responding as in the example illustrated in FIG. 9. The text generating device 100 mounted in the pet robot 10 in this manner can generate the reply sentence that can express the pseudo-personality of the pet robot 10.

Modified Example 1

In the aforementioned description, retrieving is described of the posted data including, in addition to the subject terms of the utterance of the user A, the related terms related to such subject terms. However, the retrieving related to the related terms can be omitted. In this case, the related-term estimator 172 and the related-term data storage 122 can be omitted from the functional configuration diagram illustrated in FIG. 3.

In this case, the retrieval-query extractor 170 sets only the subject terms as the retrieval query. Thereafter, the posted-data retriever 180 retrieves from the microblog server 200 the posted data of the other users including such subject terms. The evaluator 150 counts the number of the retrieved posted data to measure user-by-user the cumulative posting count of the other users. Then the sentence generator 160, on the basis of the measured cumulative posting count, selects the posted data of the other user and generates the reply sentence with respect to the utterance of the user A.

In the case in which retrieving of the related terms is omitted in this manner, processing of the text generating device 100 can be decreased. However, in the interval of the short time period T1, the probability of being able to retrieve the posted data including the subject term decreases. This decreased probability increases the probability of outputting the pro-forma expression.

Modified Example 2

In the aforementioned description, the evaluator 150 determines the degree of relevance of the other user, and on the basis of such degree of relevance, the sentence generator 160 selects the posted data for use for the reply sentence from among the posted data retrieved by the retriever 140. However, the evaluator 150 can be omitted. In this case, the evaluator 150 and the related-user data storage 123 can be omitted from the functional configuration diagram illustrated in FIG. 3. Further, in the text generation processing illustrated in FIG. 10, the processing from step S8 to step S11 can be omitted. Further, in the reply sentence generation processing illustrated in FIG. 11, the processing from step S23 to step S25 can be omitted. However, when the evaluator is omitted, the probability of generating the reply sentence using the posted data of the other user having numerous postings in the same time slot (same scene of the same television program) becomes low. That is to say, the probability increases of generating the reply sentence using the posted data of the other user whose perceptions are different from the perceptions of the user A. As a result, the probability can increase that a reply sentence would be output that would impart a sense of incongruity to the user A.

Modified Example 3

Microblogs (Twitter (registered trademark), Instagram (registered trademark), and other social network systems) have functions for compiling popular emerging topics, trend terms, rapidly emerging terms, posting term rankings, retrieving term rankings, and the like, as typified by trend terms. Thus even without a subject term of the utterance of the user or a related term for such a subject term, the text generating device 100 may insert a trend keyword in the reply sentence. An example is indicated in which the text generating device 100 generates "the face of a sleeping kitten is impossibly cute", for example. Taking the trend terms at the time to be "extremely hot weather", the text generating device 100 may insert the trend terms "extremely hot weather" in the reply sentence, and the text generating device 100 may generate the reply sentence "the face of a sleeping kitten is so very cute you could forget the extremely hot weather". Such operation enables a widening of the topic of conversation. Further, if the trend terms are taken to be "firework display", the text generating device 100 may generate a reply sentence such as "although a firework display is good, the face of a sleeping kitten is very cute". The terms that are most topical in society are highly likely to be terms noticed also by the user, and thus connection can be made to a subject of conversation, such as by the reply sentence "come to think of it, was there a fireworks display tonight?" Further, in the processing to generate a sentence including pro-forma expressions that would not cut off the topic of conversation, the text generating device 100 may be configured to utter the trend terms. For example, the text generating device 100 may be configured to generate the reply sentence "that's right, but by the way, people seem to be talking now about the extremely hot weather".

Further, an example is indicated above of a method in which, on the basis of the degree of relevance determined by the evaluator 150, the sentence generator 160 selects the posted data used for the response. However, the method of the sentence generator 160 for selection of the posted data used for the response is no is not limited to this method. For example, the sentence generator 160 may select the posted data on the basis of a number of retweets, a number of replies, a number of "likes", a number of "good" responses, a comment count, and the like with respect to a comment posted on a microblog. However, in this case, the text generating device 100 preferably includes a filtering function to remove spam tweets.

Further, the pet robot 10 and the source of distribution of the television program (content) watched by the user A may operate in cooperation with each other. For example, the distribution source of the television program may transmit a character multiplex broadcast as robot-targeted information for the pet robot 10 to receive, and the pet robot 10 may be thus configured to enable (television program) content-specific information to be acquired. Alternatively, the pet robot 10 may operate in cooperation with a content distribution source that distributes content via the Internet. The pet robot 10 and the source of distribution of the program (content) being watched by the user may be interconnected by the Internet or by a phone line. The message information for the pet robot 10 as cooperative information may be displayed in the program (content) viewed by the user A. The message information may be encoded and may be inserted between frames so that the message information is unintelligible to humans.

Further, in the above description, the text generating device 100 includes the voice inputter 111, the character inputter 112, the voice outputter 113, the display 114, the communicator 115, and the storage 120. However, the voice inputter 111, the character inputter 112, the voice outputter 113, the display 114, the communicator 115, and the storage 120 may be configured as devices external to the text generating device 100.

Further, in the aforementioned description, although the text generating device 100 is described as being mounted in the pet robot 10, the scope of the present disclosure is not limited to this configuration. For example, the controller 110 may be arranged within a server located in the cloud, and the pet robot 10 may be equipped with only the communicator 115 and an inputter-outputter. Thereafter, the utterance of the user acquired form the inputter of the pet robot 10 is transmitted to a server on the cloud via the communicator 115. Thereafter, the text generation processing may be performed within the server on the cloud.

Further, in the above description, the evaluation retrieving time period setter 182 is described as setting the time period T2 for retrieving the posted data related to the utterance of the user A. However, a configuration may be used in which the user A can set this time period T2 by the character inputter 112.

Further, in the above description, an example is described in which the evaluation retrieving time period setter 182, for each utterance of the user A, limits the time period for evaluation of the posted data. However, rather than using a configuration that includes the evaluation retrieving time period setter 182 in the text generating device 100, a configuration may be used that evaluates the degree of relevance of the other users during the time period of continuation of the television program. For example, in the case of a television program that has a broadcast time period of 1 hour, the text generating device 100 may be configured to measure the degree of relevance of the other users continuously for 1 hour. Such configuration enables the text generating device 100 to acquire much posted data of the other users watching the same television program, and enables a lowering of the frequency of output of the pro-forma expressions. However, the probability increases that the text generating device 100 acquires numerous posted data of other users who post the posted data in a time slot (of the same scene of the same television program) different from the time slot in which the user A has a prior utterance. That is to say, the probability increases that the text generating device 100 generates a reply sentence using the posted data of the other user who has a perception different from the perception of the user A.

Further, in the above description, an example is described in which the evaluator 150 evaluates the degree of relevance of the other users for each television program. However, the evaluation of the other users is not limited to this method. For example, the evaluator 150 may be configured to perform evaluation continuously for a prescribed time period such as for one month. Specifically, the text generating device 100 measures a one day portion of the cumulative posting count of the related user, and continues daily to make such measurements. Then the text generating device 100 may calculate a value by adding up cumulative posting counts for the immediately previous 30 days, and may use the value as a final cumulative posting count for evaluation of the other users. In the case of determination of the degree of relevance is made within a single television program, the text generating device 100 retrieves the posted data of the other users who continue to watch the same television program, thereby enabling an increase of the probability that the text generating device 100 can generate the reply sentence suitable for the utterance of the user A. However, in the case in which the degree of relevance of the other users is determined over a time period such as one month rather than just for one television program, the probability can increase that the text generating device 100 selects the posted data of a certain other user who always posts a response to the utterance of the user A. This enables the text generating device 100 to generate the reply sentence as if in a chat with an acquaintance.

Further, in the above description, an example is described in which the template selector 162 selects the template for expressing personality on the basis of the method of expressing adjectives, but the template for generating the reply sentence expressing pseudo-personality is not limited to this configuration. For example, the template selector 162 may select, as a template for an "impatient type" personality, a template for generation of the reply sentence using numerous abbreviations. Further, the template selector 162 may select, as a template for a "polite type" personality, a template for generation of the reply sentence using almost no abbreviations.

Further, the text generating device 100 may omit the processing of step S7 from the text generation processing described with reference to FIG. 10. That is to say, in the case of prior inability to retrieve the posted data corresponding to the time period T1, the text generating device 100 may be configured to only output the pro-forma expression.

Further, in the reply sentence generation processing described with reference to FIG. 11, in the case of prior inability to retrieve the posted data of the other users for whom the degree of relevance is greater than or equal to the threshold, the text generation device 100 also may generate the sentence including the pro-forma expressions. That is to say, rather than the processing of step S24, the text generating device 100 may be configured to execute processing to generate the sentence including the pro-forma expressions.

Further, in the case of multiple posted data by other users having the cumulative posting count greater than or equal to the threshold in the processing of step S25 of the reply sentence generation processing described with reference to FIG. 11, although an example is described in which the posted data is selected that has the highest degree of relevance, the text generating device 100 may be configured to select the posted data at random from among these multiple posted data.

Further, in the above description, an example is described in which the time period T1 for retrieving the microblog data for generating the reply sentence responding to the utterance made by the user A is set to 1 to 10 seconds. However, this time period T1 is not necessarily limited to this described time period, and the text generating device 100 may be set to a time period T1 such as 30 seconds or 60 seconds.

Further, in the above description, although a case is described in which the communicator 115 is a communication device for performing wireless communication, the communicator 115 may be a communication device that performs wired communication such as by optical communication.

Further, in the above description, a case is described in which the other user posts to the microblog server 200 from the terminal 300, this terminal 300 may alternatively be a pet robot 10, such as that used by the user A, that includes a text generating device 100, or this terminal 300 may alternatively be a computer such as a general personal computer (PC) including a communication function.

Each of the functions of the text generating device 100 of the present disclosure may be achieved by a computer such as a general PC. Specifically, in the aforementioned embodiments, a program for the text generation processing performed by the text generating device 100 is described as being recorded beforehand to the ROM of the storage 120. However, the program may be distributed in the form of a computer-readable recording medium storing the program, such as a flexible disc, a compact disc read only memory (CD-ROM), a digital versatile disc (DVD), magneto-optical disc (MO), and the like, and then by reading the program to install the program on the computer, the computer may be configured to enable the achievement of each of the aforementioned functions.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A dialog device comprising:
   a processor; and
   a speaker or a display;
   the processor being configured to
   acquire an utterance of a user relative to content provided in real time,
   set a retrieving time period that is a time period of retrieval in response to a timing of the utterance of the user,
   continuously execute a retrieval operation to retrieve posted data from a microblog server during a period when the set retrieving time period elapses since the utterance of the user, the posted data relating to the content and being an utterance of another user who posts, during the period when the set retrieving time period elapses since the utterance of the user, an utterance related to the utterance of the user from a terminal other than the dialog device to the microblog server;
   generate, based on the posted data retrieved by the retrieval operation, a reply sentence that is a response to the acquired utterance of the user; and
   output the generated reply sentence to the user through the speaker or display, wherein the processor
     until a count of posted data related to the utterance of the user having given by other users since the utterance of the user is less than a threshold, measures a count of posting related to the utterance of the user given by each of the other users,
     updates a cumulative posting count of each of the other users by cumulating, each time the user makes an utterance, the count of posting of each of the other users having measured since start of the content, and
     selects, from among the other users, a user for which the posted data is to be retrieved from the microblog server, based on the updated cumulative posting count of each of the other users.

2. The dialog device according to claim 1, wherein the processor
   extracts a subject term of the utterance as a retrieval query from the acquired utterance of the user, and
   retrieves posted data including the retrieval query from the microblog server.

3. The dialog device according to claim 2, wherein the processor extracts as the retrieval query the subject term and a related term related to the subject term.

4. The dialog device according to claim 2, wherein the processor sets the retrieving time period based on an operation of the user.

5. The dialog device according to claim 4, wherein the processor
   when the processor is unable to retrieve the posted data including the retrieval query from among the microblog data until the retrieving period time elapses from the timing of the utterance of the user, generates a pro-forma sentence including a pro-forma expression for not imparting a sense of incongruity to the user, and
   outputs, instead of the reply sentence, the generated pro-forma sentence to the user through the speaker or the display.

6. The dialog device according to claim 5, wherein the processor acquires a trend term from the microblog server and generates the pro-forma sentence including the pro-forma expression and the trend term.

7. The dialog device according to claim 1, wherein the processor
   determines a degree of relevance between the user and the other user having posted the retrieved posted data, and
   selects, from among the retrieved posted data, posted data based on the determined degree of relevance and generates the reply sentence based on the selected posted data.

8. The dialog device according to claim 7, wherein the processor determines that the degree of relevance is higher when a count of postings, related to the utterance of the user, of the other user is higher.

9. The dialog device according to claim 7, wherein the processor selects the posted data based on a count of postings, related to the utterance of the user, of a plurality of the other users and the determined degree of relevance, and generates the reply sentence based on the selected posted data.

10. The dialog device according to claim 7, wherein the processor selects the posted data based on a number of comments or a number of retweets of the retrieved posted data and the determined degree of relevance, and generates the reply sentence based on the selected posted data.

11. The dialog device according to claim 1, wherein the processor
   selects a template for generating the reply sentence, wherein
   generates the reply sentence by fitting the retrieved posted data in the selected template.

12. The dialog device according to claim 11, wherein the processor
   sets a pseudo-personality of the dialog device, and
   selects the template in accordance with the pseudo-personality of the dialog device.

13. The dialog device according to claim 1, wherein
   the dialog device receives cooperative information from a broadcast source of the content provided in real time, and
   when the utterance of the user relates to the content, the processor generates the reply sentence based on the cooperative information and the posted data.

14. The dialog device according to claim 13, wherein the broadcast source and the dialog device are interconnected via a communication line, and the processor receives the cooperative information via the communication line.

15. The dialog device according to claim 13, wherein
   the broadcast source and the dialog device are not interconnected,
   the broadcasted content includes message information for the dialog device, the message information being unintelligible to the user, and
   the processor receives the cooperative information by detecting the message information.

16. A reply sentence generation method comprising:
   acquiring an utterance of a user relative to content provided in real time;
   setting a retrieving time period that is a time period of retrieval in response to a timing of the utterance of the user;
   connecting to a microblog server;
   continuously executing a retrieval operation to retrieve posted data from the microblog server during a period when the set retrieving time period elapses since the utterance of the user, the posted data relating to the content and being an utterance of another user who posts, during the period when the set retrieving time period elapses since the utterance of the user, an utterance related to the utterance of the user from a terminal other than the dialog device to the microblog server;
   generating, based on the posted data retrieved by the retrieval operation, a reply sentence that is a response to the acquired utterance of the user;
   until a count of posted data related to the utterance of the user having given by other users since the utterance of the user is less than a threshold, measuring a count of posting related to the utterance of the user given by each of the other users;
   updating a cumulative posting count of each of the other users by cumulating, each time the user makes an utterance, the count of posting of each of the other users having measured since start of the content; and
   selecting, from among the other users, a user for which the posted data is to be retrieved from the microblog server, based on the updated cumulative posting count of each of the other users.

17. A non-transitory computer-readable recording medium storing a program for causing a computer to function as:
   an acquirer that acquires the utterance of a user relative to content provided in real time;
   a setter that sets a retrieving time period that is a time period of retrieval in response to a timing of the utterance of the user;
   a retriever that continuously executes a retrieval operation to retrieve posted data from a microblog server during a period when the set retrieving time period elapses since the utterance of the user, the posted data relating to the content and being an utterance of another user who posts, during the period when the set retrieving time period elapses since the utterance of the user, an utterance related to the utterance of the user from a terminal other than the dialog device to the microblog server;
   a sentence generator that generates, based on the retrieved posted data retrieved by the retriever, a reply sentence that is a response to the acquired utterance of the user; and
   an evaluator that
      until a count of posted data related to the utterance of the user having given by other users since the utterance of the user is less than a threshold, measures a count of posting related to the utterance of the user given by each of the other users;
      updates a cumulative posting count of each of the other users by cumulating, each time the user makes an utterance, the count of posting of each of the other users having measured since start of the content; and
      selects, from among the other users, a user for which the posted data is to be retrieved from the microblog server, based on the updated cumulative posting count of each of the other users.

* * * * *

UNITED STATES PATENT AND TRADEMARK OFFICE
CERTIFICATE OF CORRECTION

PATENT NO. : 10,770,068 B2
APPLICATION NO. : 15/785004
DATED : September 8, 2020
INVENTOR(S) : Takahiro Tanaka Page 1 of 1

It is certified that error appears in the above-identified patent and that said Letters Patent is hereby corrected as shown below:

In the Claims

Claim 1, Column 16, Line 10, after "display" delete ";" and add ","
Claim 1, Column 16, Line 31, after "or" add "the"

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*